(12) United States Patent
Noeth et al.

(10) Patent No.: US 12,013,934 B2
(45) Date of Patent: *Jun. 18, 2024

(54) APPARATUS AND METHOD FOR CONDUCTING ENDPOINT-NETWORK-MONITORING

(71) Applicant: Huntress Labs Incorporated, Ellicott City, MD (US)

(72) Inventors: Robert Julian Noeth, San Antonio, TX (US); Ernest Gregory Ake, San Antonio, TX (US)

(73) Assignee: Huntress Labs Incorporated, Ellicott City, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,005

(22) Filed: May 24, 2023

(65) Prior Publication Data
US 2023/0394138 A1    Dec. 7, 2023

Related U.S. Application Data

(63) Continuation of application No. 17/839,372, filed on Jun. 13, 2022, now Pat. No. 11,698,963, which is a
(Continued)

(51) Int. Cl.
*G06F 21/55* (2013.01)
*G06F 21/56* (2013.01)
(Continued)

(52) U.S. Cl.
CPC .......... *G06F 21/552* (2013.01); *G06F 21/554* (2013.01); *G06F 21/567* (2013.01);
(Continued)

(58) Field of Classification Search
CPC .... G06F 21/552; G06F 21/554; G06F 21/567; H04L 43/028; H04L 43/062;
(Continued)

(56) References Cited

U.S. PATENT DOCUMENTS 10,033,747 B1 *   7/2018   Paithane ............... G06F 21/566
10,171,423 B1 *   1/2019   Woodberg ........... H04L 63/1408
(Continued)

OTHER PUBLICATIONS

"The Pros & Cons of Intrusion Detection Systems", https://www.rapid7.com/blog/post/2017/01/11/the-pros-cons-of-intrusion-detection-systems/ , pp. 1 to 12. Jan. 11, 2017. Last updated at Tue, Oct. 27, 2020 14:09:30 GMT.

*Primary Examiner* — Gary S Gracia
(74) *Attorney, Agent, or Firm* — COOLEY LLP

(57) ABSTRACT

Provided is an intrusion detection technique configured to: obtain kernel-filter criteria indicative of which network traffic is to be deemed potentially malicious, determine that a network packet is resident in a networking stack, access at least part of the network packet, apply the kernel-filter criteria to the at least part of the network packet and, based on applying the kernel-filter criteria, determining that the network packet is potentially malicious, associate the network packet with an identifier of an application executing in userspace of the operating system and to which or from which the network packet is sent, and report the network packet in association with the identifier of the application to an intrusion-detection agent executing in userspace of the operating system of the host computing device, the intrusion-detection agent being different from the application to which or from which the network packet is sent.

19 Claims, 6 Drawing Sheets

Related U.S. Application Data continuation of application No. 16/984,068, filed on Aug. 3, 2020, now Pat. No. 11,361,071, which is a continuation of application No. 15/959,037, filed on Apr. 20, 2018, now Pat. No. 10,762,201.

(60) Provisional application No. 62/487,792, filed on Apr. 20, 2017.

(51) Int. Cl.
  *H04L 9/40* (2022.01)
  *H04L 43/028* (2022.01)
  *H04L 43/062* (2022.01)
  *H04L 43/0876* (2022.01)
  *H04L 47/10* (2022.01)
  *H04L 69/22* (2022.01)

(52) U.S. Cl.
  CPC .......... *H04L 43/028* (2013.01); *H04L 43/062* (2013.01); *H04L 63/0263* (2013.01); *H04L 63/1408* (2013.01); *H04L 63/1416* (2013.01); *H04L 63/1425* (2013.01); *H04L 63/1441* (2013.01); *H04L 63/20* (2013.01); *H04L 43/0876* (2013.01); *H04L 47/10* (2013.01); *H04L 69/22* (2013.01)

(58) Field of Classification Search
  CPC . H04L 43/0876; H04L 47/10; H04L 63/0263; H04L 63/1408; H04L 63/1416; H04L 63/1425; H04L 63/1441; H04L 63/20; H04L 69/22
  See application file for complete search history.

(56) References Cited

U.S. PATENT DOCUMENTS

| | | |
|---|---|---|
| 10,762,201 B2 | 9/2020 | Noeth et al. |
| 11,361,071 B2 | 6/2022 | Noeth et al. |
| 2003/0167410 A1* | 9/2003 | Rigstad .................. H04L 63/20 726/1 |
| 2004/0255162 A1* | 12/2004 | Kim .................... H04L 63/1408 709/224 |
| 2005/0102505 A1* | 5/2005 | Chung ............... H04L 63/1441 713/164 |
| 2006/0150249 A1* | 7/2006 | Gassen ................ G06F 21/606 726/23 |
| 2007/0150574 A1* | 6/2007 | Mallal ................. H04L 63/1408 709/223 |
| 2008/0192858 A1* | 8/2008 | Kim ..................... H04L 12/189 375/295 |
| 2009/0013407 A1* | 1/2009 | Doctor .................. H04L 63/02 726/23 |
| 2010/0011440 A1* | 1/2010 | Strauss .................. G06F 21/55 726/23 |
| 2010/0070776 A1* | 3/2010 | Raman ................. G06F 21/552 713/189 |
| 2012/0222114 A1* | 8/2012 | Shanbhogue ......... H04L 63/029 726/22 |
| 2014/0047541 A1* | 2/2014 | Boyce .................... G06F 21/51 726/22 |
| 2014/0181972 A1* | 6/2014 | Karta .................. H04L 63/1416 726/23 |
| 2014/0283053 A1* | 9/2014 | Gregg ................ H04L 63/1441 726/23 |
| 2016/0036837 A1* | 2/2016 | Jain ..................... H04L 63/1416 726/23 |
| 2016/0036838 A1* | 2/2016 | Jain ..................... H04L 63/1416 726/23 |
| 2017/0005986 A1* | 1/2017 | Bansal .................... G06F 9/455 |
| 2017/0142142 A1* | 5/2017 | Kobres ............... H04L 63/1416 |
| 2018/0307833 A1 | 10/2018 | Noeth et al. |
| 2021/0110033 A1 | 4/2021 | Noeth et al. |
| 2023/0004640 A1 | 1/2023 | Noeth et al. |

* cited by examiner

APPARATUS AND METHOD FOR CONDUCTING ENDPOINT-NETWORK-MONITORING

CROSS-REFERENCE TO RELATED APPLICATIONS

This application is a continuation of U.S. Non-Provisional application Ser. No. 17/839,372, filed on Jun. 13, 2022, titled "APPARATUS AND METHOD FOR CONDUCTING ENDPOINT-NETWORK-MONITORING" (now U.S. Pat. No. 11,698,963), which is a continuation of U.S. Non-Provisional application Ser. No. 16/984,068, filed on Aug. 3, 2020, titled "APPARATUS AND METHOD FOR CONDUCTING ENDPOINT-NETWORK-MONITORING," (now U.S. Pat. No. 11,361,071) which is a continuation of U.S. Non-Provisional application Ser. No. 15/959,037, filed Apr. 20, 2018, titled "APPARATUS AND METHOD FOR CONDUCTING ENDPOINT-NETWORK-MONITORING" (now U.S. Pat. No. 10,762,201), which claims the benefit of U.S. Provisional Patent Application 62/487,792, filed Apr. 20, 2017, titled "APPARATUS AND METHOD FOR CONDUCTING ENDPOINT-NETWORK-MONITORING AND PACKET TAGGING." The entire content of each afore-listed earlier-filed application is hereby incorporated by reference for all purposes.

BACKGROUND

1. Field

The present disclosure relates generally to cyber security and, more specifically, to conducting endpoint-network-monitoring.

2. Description of the Related Art

Often, businesses and other entities operating networks of computing devices seek to secure those computing devices and the network from malicious actors, such as hackers seeking to exploit data extracted through the network or interfere with operation of the network. One class of tools for securing such networks are intrusion detection systems. These systems often include an appliance or executable code that monitors communications via the network. Such systems are often used to detect patterns in network traffic or computer usage indicative of an attack. Such systems, however, are often expensive to install and difficult to operate, in part due to the complexity that can arise from the way existing techniques scale with larger, more complex networks or collections of networks.

SUMMARY

The following is a non-exhaustive listing of some aspects of the present techniques. These and other aspects are described in the following disclosure.

Some aspects include a process, including: instantiating, with one or more processors, a networking-stack, intrusion-detection kernel driver in kernel space of an operating system of a host computing device connected to a network, where the kernel driver is configured to: obtain kernel-filter criteria indicative of which network traffic is to be deemed potentially malicious, determine that a network packet is resident in a networking stack of the operating system of the host computing device, access at least part of the network packet, apply the kernel-filter criteria to the at least part of the network packet and, based on applying the kernel-filter criteria, determining that the network packet is potentially malicious, associate the network packet with an identifier of an application executing in userspace of the operating system and to which or from which the network packet is sent, and report the network packet in association with the identifier of the application to an intrusion-detection agent executing in userspace of the operating system of the host computing device, the intrusion-detection agent being different from the application to which or from which the network packet is sent; and instantiating, with one or more processors, the intrusion-detection agent in userspace of the operating system of the host computing device, wherein the intrusion-detection agent is configured to: obtain threat-classification criteria indicative of which reports of network packets identify potential attacks; access the report of the network packet from the networking-stack, intrusion-detection kernel driver; identify the application from the report of the network packet; access a forensic record associated with the application in memory by the operating system; apply the threat-classification criteria to the report of the network packet and the forensic record and, based on applying the threat-classification criteria, classify the network packet as malicious; and in response to classifying the network packet as malicious, recording an indication of the classification in memory, wherein: the intrusion-detection agent is configured to report the classification to a security event processing system via a network; and the operations comprise instantiating the security event processing system on one or more computing devices other than the host computing device, wherein the security event processing system is configured to: receive the report of the classification and reports of a plurality of other classifications from other instances of the intrusion-detection agent executing on other computing devices, and determine that an attack is occurring or is potentially occurring based on the report of the classification and reports of a plurality of other classifications from other instances of the intrusion-detection agent executing on other computing devices.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
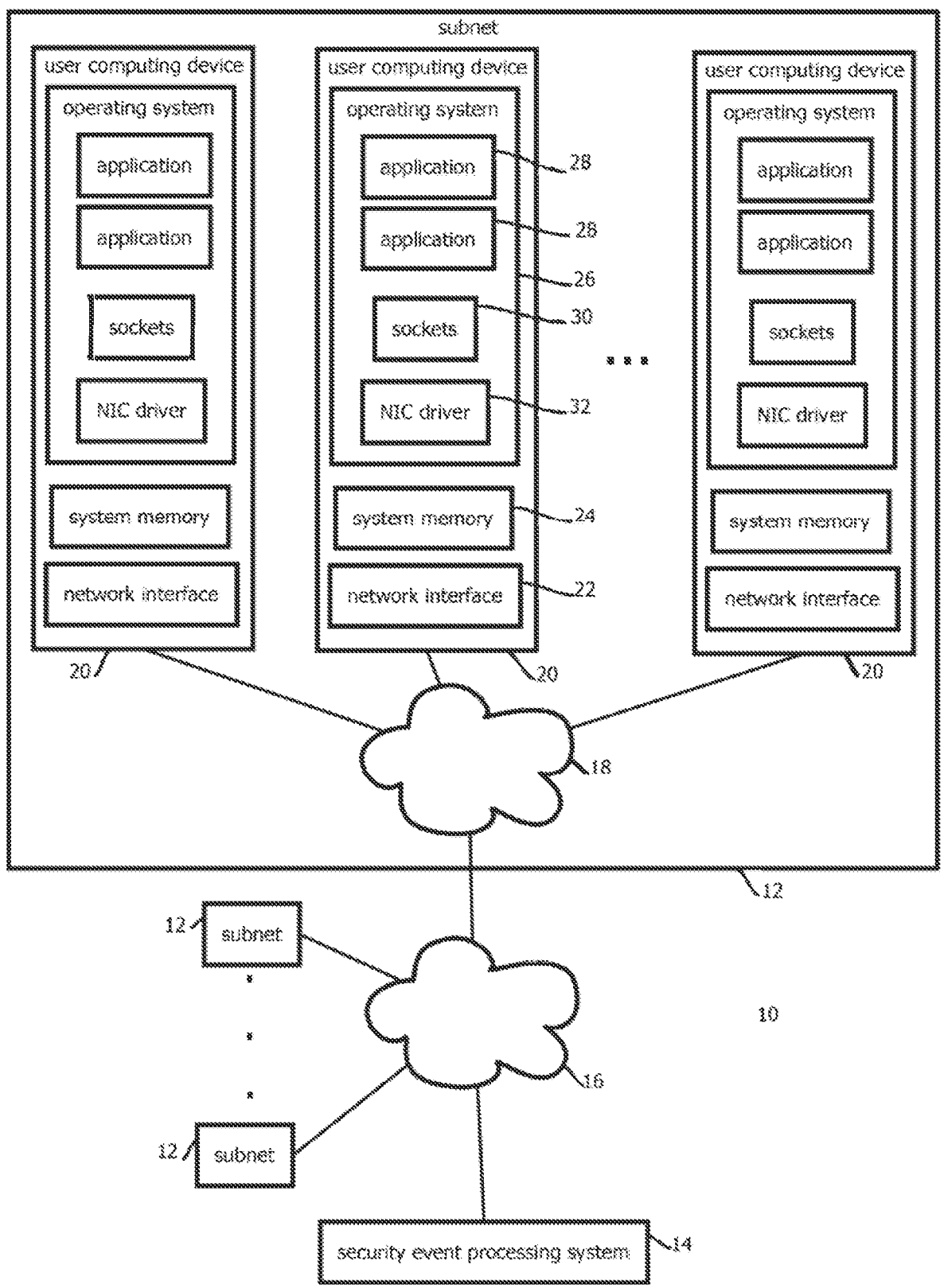
FIG. 1 is a logical and physical architecture block diagram that shows an example of a computing environment by which the present techniques may be implemented.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of cyber security. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Many existing intrusion detection systems are preventative in focus. Such systems are often designed to identify and deny malware-based attacks upon (and responsive to) instantiation of the attack. Despite these measures, advanced adversaries are often still able to bypass systems implementing traditional approaches. If attackers can bypass these controls, they effectively have free range over the system, data, and user engagement with that system.

Most traditional intrusion detection systems have either been network centric or host centric. Network intrusion detection systems (NIDS) often are based on appliances positioned at chock points on a network (e.g., routers or switches), and such systems typically detect intrusions by inspecting passing network traffic (e.g., at the header level or in some cases with deep packet inspection) and detecting offending patterns or policy violations. In contrast, host intrusion detection systems (HIDS) typically execute on network hosts (e.g., the endpoint computing devices executing on a network). HIDS often analyze executable code and behavior of the host computing device and detect intrusions based on the available information. Both NIDS and HIDS present tradeoffs, such as ease of deployment, response times, and different vulnerabilities, some of which are expected to become more severe in the near future.

HIDS often rely on signature or other patterns (e.g., in virus signature databases) in malware, which with increasing regularity are often defeated by varying the code with which malware functionality is expressed, for instance by injecting malware code into various otherwise non-malicious executables, recompiling malware source code, encrypting malware code with a random salt, or polymorphic viruses.

NIDS on the other hand, are going (at least partially) blind due to changes in networking standards and usage of transport-layer and application-layer encryption. As a result, existing security tools for network traffic analysis are lacking in various respects. This is true of both hardware and software implementations. Generally, these analytic tools and processes model the network as a singular entity disparate from the endpoints (servers, user workstations) that generate the passively observed network traffic. Increased use of network encryption technologies (such as Transport Layer Security (TLS) and Virtual Private Network (VPN)s) make this task more complex and defeat many forms of pattern matching and policy enforcement. In many cases, both analysts and security products fail to accurately identify malicious traffic passively within the network when these encryption technologies are employed. The amount of context available to a NIDS for any given packet is decreasing, and this is expected to make these systems more vulnerable.

To combat this, previously TLS decryption appliances have been deployed at the gateway of enterprise networks providing visibility into the content of these encrypted communications. However, with the impending approval and future adoption of TLS 1.3, it is expected that there will be no feasible mechanism to decrypt TLS traffic live or offline at a later date. Often the information by which attacks are detected is encrypted at the point of inspection, impairing or blocking use of traditional approaches. It is expected that the current network security technologies will fail to provide value to the organization and new solutions will be needed to give context to these encrypted sessions while increasing security of the communication, system, and users.

Indeed, the compounding effect of singular focused network analysis tools and limited to no visibility within network subnets provides ample cover for malicious actors to exploit and move within the network virtually undetected. This process is referred to as 'pivoting' in the network and is what malicious hackers do to maintain multiple accesses and footholds in the network. Prime examples of this attack technique were used in large hacks in the news in recent years. These techniques were used to evade network security professionals from removing the threats therein. In many cases, some of the best companies in network defense were employed, but due to the inherent nature of endpoint and network forensics being dissimilar tradecraft; hackers were able to exploit this gap in visibility to obtain and maintain network access.

Vulnerability can take various forms. False positives can be just as damaging as false negatives. The amount of events to be analyzed on a given network in a given day can exceed tens or hundreds of millions of distinct events, any one of which can cause a pattern match or policy violation. Even a false positive rate of 0.001% can overwhelm information technology staff and cause them to disable or downgrade protections. Thus, accuracy, both for type 1 and type 2 errors, is critical.

Hybrid-NIDS-and-HIDS systems have been proposed. Such systems combine data and analyses from network monitoring with data and analyses from monitoring applications executing on the host system. Such systems, however, are often overly taxing on the host system's resources and constrained in the range of activities monitored on the host system, e.g., focusing on the above-described types of pattern detection that is readily defeated with increasing regularity.

The inventors have realized that these issues with hybrid NIDS-and-HIDS systems can be mitigated by integrating the NIDS functionality into a kernel driver that applies a first-pass filter to detected events and integrating that functionality with an expanded view of the host device's activities afforded by an agent executing in userspace of the host machine. Analyzing network traffic with a kernel driver affords a privileged view on the operation of the network stack generally not available to applications executing in userspace of the host machine (i.e., a region of virtual memory isolated from kernel memory), including all packets sent and received by all applications, with access available at each level of encapsulation, ranging from Ethernet frames, to IP packets encapsulated in the Ethernet frames, to TCP packets encapsulated in the IP packets. Shielding the agent executing on the host from the computational load of executing a full analysis on every packet is expected to conserve computing resources and afford faster analysis of packets, and dynamically adjusting the first pass filter responsive to context detected by the host or a cloud-based component, is expected to allow the tradeoff between computational load and error rate to be dynamically modulated as is appropriate to current conditions (e.g., favoring a more conservative analysis when the probability of an attack is determined to be relatively high). Some embodiments aggregate data and analyses across hosts to detect network-wide patterns, consolidate reporting, and dynamically adjust analyses on one host responsive to attacks detected on other hosts. Some embodiments may afford on-host intrusion detection and prevent in real time, as the attack is occurring, in some cases applying preventative or ameliorative measures before the attack is effected, e.g., within less than 1 second of an attack beginning, within less than 500 milliseconds, within less than 100 milliseconds, or within less than 10 milliseconds.

Some embodiments may address additional attack vectors through packet tagging approaches. It should be emphasized, though, the embodiments are not limited to systems applying these techniques, which is not to suggest that any other description is limiting. Many of the problems expected to emerge in the coming years were baked into the Internet from its early design. Internet Protocol (IP) addressing and the underlying models such as the Open Systems Interconnection (OSI) and TCP/IP outline the methods for modulating and demodulating packet data so that computers on dissimilar networks can communicate seamlessly with one another. This open model for communication was a boon for the creation and expansion of the internet, but did not account for the security needs that would soon materialize.

Attacks such as spoofing and man-in-the-middle (MITM) attacks have prospered in recent years. The inventors believe this to be the case because there is no effective security mechanisms incorporated into the IP stack. Likewise, the inventors have realized that because there are no 'source-host' validation mechanisms within the IP stack or previously mentioned models, there lies no clear mechanism to provide alternate validation or multi-factor authentication and approval of communications within the network. A review of both the OSI and TCP/IP models identify the layers that handle the physical and logical communication mechanism and loosely describe the 'application layer'. This is the application that is generating or receiving data via the network. This can be in the form of Microsoft Outlook, Google Chrome, or a malicious Remote Administration/Access Tool (RAT). Without knowing what the host is doing, most passive network solutions fail to identify the context of the communication and the potential threat that each application presents, in part, due to impaired network and endpoint forensics. The collection, extraction, analysis and correlation of these events to one another can take hours to days for a singular event of interest. This does not scale and further provides malicious actors time to complete their objectives.

To mitigate these issues and others, some embodiments execute targeted forensic activities and advanced modeling prediction based upon network initiation by attackers (e.g., by malware composed on controlled by an attacker). The inventors have realized that communication is the most vulnerable event an adversary must undertake. Almost every malware or non-malware attack requires communication across a network to be successful. Leveraging this insight, embodiments are configured as described below to identify advanced and staged attacks overlooked and undiscovered by other detection and preventative means.

Some embodiments implement a three-stage architecture that ranges from kernel level access, through userland code in the operating system of an individual computing device (or other host, e.g., virtual machine, container, unikemel, etc), to network-level and multi-tenant views of threats implemented with distributed applications, like cloud-based security event processing systems. In some cases, the finest grained, most privileged access is obtained at the kernel level with a kernel driver described below that monitors and in some cases exercises control of a networking stack of the operating system. That driver may interface with an agent executing in userland space of the operating system, which may access various application program interfaces of the operating system to monitor and in some cases control various aspects of applications executing on the host device. The agent may in turn interface with a cloud-based security event processing system that aggregates data from (and in some cases controls security-related processes of) a plurality of computing devices (or other hosts), each having a respective instance of the driver and agent. In some cases, the security event processing system may aggregate data subnet-wide, across subnets, and in some cases, across tenants to afford a global view on potential attacks.

The kernel driver may be configured to execute in various host operating systems, including Windows™, Linux™, and Apple MacOS™. The driver may access the most granular and highest bandwidth set of data for a given computing device relative to the other components, in some cases analyzing every packet (or frame) sent or received by a given host. Such analysis may reveal various events detected by the driver, which may be sent to the agent, and which may cause the agent to conduct targeted data collection and forensic analysis tasks. Resulting information may be funneled by the driver to the agent as a data source to conduct triggered analysis. The kernel may provide a ground truth to process initiation by the agent, and in some cases, the driver may also deny and disrupt network events once identified as malicious or unallowed by the agent. In some cases, the driver may implement some or all of the following functionality:

a. Captures network traffic;
   b. Performs filtering to include collection of all or partial content as well as packet source, destination, port blocking;
   c. Sends copy to agent component (e.g., of data passing filters, or responsive to detecting a pattern in network traffic specified by the rules);
   d. Receives rules from agent component to update/modify filter rules;

e. Injecting "packet tags" providing true source identifiers in both TCP and UDP packets or in some embodiments, packet tags may be inserted at layers, for example in IP headers; and f. Executing active defense measures (e.g., responsive to the rules or instructions from the agent), such as traffic redirection/forwarding, data flow throttling, timeout, and data injection.

The agent may execute in user space of the host OS of the device executing the driver. The agent may gather information based upon a trigger it receives from the driver or tasking. The agent may manage tasks ranging from agent health, installation, uninstallation, communication with command and control, as well as interacting with the kernel and conducting forensic and analytic processes of the acquired forensic data. The agent may source and validate data to be forwarded to the analytic cloud for processing, e.g., by a remote security event processing system. Further, the agent may conduct regular (e.g., periodic) surveys of the system, users, permissions, patch/configuration status and vulnerabilities. In some cases, the driver may implement some or all of the following functionality:

a. Utilizes network trigger via kernel driver to engage m targeted forensic and investigative analysis of the communicant source.

b. Injects configurable time delay to identify, correlate, and acqmre memory snapshot of communicating process in memory space.

c. Communicates with kernel driver module to update, define, cancel filtering and collection rulesets for network event data to include creating block lists or firewall rules.

d. Correlates network event triggers and application to systems event logs.

e. Agent modules conduct forensic processes, e.g., accessing memory, file, registry, configuration, process, users, network, system events to gather data about processes in question for maliciousness classification.

f. Utilizes heuristic and machine learning engine to ascertain predictions of maliciousness and outlier events of acquired and analyzed data.

g. Creates local data store of gathered information and sends telemetry data to cloud store.

h. Agent can send regular telemetry events or urgent notifications/alert messages to the cloud data store for expedient processing i. Receives tasking events from cloud and authorized users of the cloud In some embodiments, the kernel driver associates network packets with explicit unique identifiers of user space applications, such as process identifiers. In some embodiments, the kernel driver associates network packets with an identifier of an application that indirectly identifies the application. Examples of such identifiers of applications include an identifier of a network socket that the application has registered to use with the operating system. Some embodiments may associate the network packet with the identifier of the network socket or similar value, and that value may be mapped to a process identifier by the agent executing in user space.

In some embodiments, the cloud based (or on-premises) security event processing system provides a strategic view of the network for comparing/contrasting events across customer datasets to identify scaled targeting campaigns and increase accuracy of data model sets. In some embodiments, analytics in the cloud (e.g., in an instance of the security event processing system hosted in a remote data center accessed via the Internet from monitored networks) identify anomalous outliers, events that match known malicious patterns or events that simply do not comply with the customer's network policy. Some implementations may, in response to detected anomalies, pattern matches, or policy violations, send a message alerting a customer, and some implementations of the cloud analytic components may task (e.g., send a message instructing) the offending system/agent for more corroborating evidence/data. This automation is expected to reduce time loss in current security operations. In some traditional systems, humans receive alerts, and then have to utilize a myriad of tools and expertise to gather evidence, rank the threat, and engage in steps to deny and remediate. This can be extremely time consuming or in some cases never accomplished because humans are easily overwhelmed by the sheer number of alerts. Furthermore, human engagement with embodiments-tasking agents, closing alerts, answering simple questions about the alert type, accuracy, remediation steps, etc., provides a training set by which these human triggered events and behavior are used to train an artificial intelligence algorithm to mimic human behavior and respond to alerts. Some embodiments train the system to determine the most efficient (or more efficient that some options) data needed to make a prediction and recommendation (and even automatically remediate the issue) of what is malicious and how to deal with it based upon monitoring and classifying human interaction with the system. Some embodiments, thus, may afford a self-defending network using AI. (None of which is to suggest that systems relying on human intervention or any other feature is disclaimed.) To these and other ends, some embodiments of the security event processing system include the following functionality:

a. Creates holistic record of agent installations and associated telemetry data.

b. Scaled data analytic models identify outliers of events and patterns of known malicious activity to alert and engage with associated agents to acquire current/corroborating data and/or to remediate and deny continued malicious activity in the network.

c. Provides data store to conduct analytics and analysis for various stakeholders.

d. Contain profiles associated to machine, network address, and users e. Utilizing adversarial neural networks, advanced models may conduct a series of automated requests and analysis of cloud data stores and tasked endpoint agent collection to create deterministic predictions of maliciousness based on classifiers of historical events, open source data, and recorded user/human engagement with the platform.

Some embodiments may implement some of the above approaches with ensemble modeling techniques, neural networks, decision trees, classification trees, clustering algorithms, and in some cases, an adversarial neural network may be trained with reinforcement learning based upon human/system interaction (e.g., by training an agent model on the human interaction and then pitting the agent model against the adversarial neural network.

FIG. 1 shows an example of a computing environment 10 by which the present techniques may be implemented. The illustrated computing environment 10 includes a plurality of subnets 12 connected to one another via the Internet 16 and each in communication with a security event processing system 14. In some embodiments, the set of subnets 12 may each correspond to different subnets of a single organization, for instance each corresponding to a different geolocation of the organization. In some embodiments, each of the subnets 12 may include a subnetwork 18, such as a network having a private Internet protocol address space. In some embodiments, the subnet 18 may be connected to the Internet 16 via a router and may include various switches by which the different illustrated computing devices 20 on the subnet 18 communicate. In some embodiments, each of the computing devices 20 may include a network interface 22, system memory 24, and an operating system 26. In some embodiments, the network interface 22 may be a ethernet network interface or a Wi-Fi network interface. In some embodiments, system memory 24 is dynamic random-access memory storing both program code and network traffic being sent or received in buffers. In some embodiments, the operating system 26 may execute within the operating system 26 a Col. network interface driver 32, which may exchange network communications with various applications 28 via network sockets 30. In some embodiments, applications 28 may register with the operating system 26 to send or receive data via respective network sockets 30. In some embodiments, the operating system 26 may include a network stack by which information being sent or received on the network is encapsulated into packets or decapsulated from packets.

In some embodiments, the various user computing devices 20 may communicate with one another via various protocols. In some embodiments, these protocols may include the Internet protocol such as Internet Protocol version 4 or Internet Protocol version 6. Some embodiments may also communicate via transmission control protocol (TCP), user datagram protocol (UDP), or various other transport layer protocols, for instance with packets in one protocol being encapsulated as payloads in other, lower level protocols.

In some embodiments, the computing devices 20 may implement techniques described below by which network traffic is monitored and classified, and the computing devices 20 may aggregate this information and send the gathered information to the security event processing system 14, which may aggregate information from a plurality of different user computing devices 20, for instance on a single subnet or a plurality of subnets 12.

Figure 4:
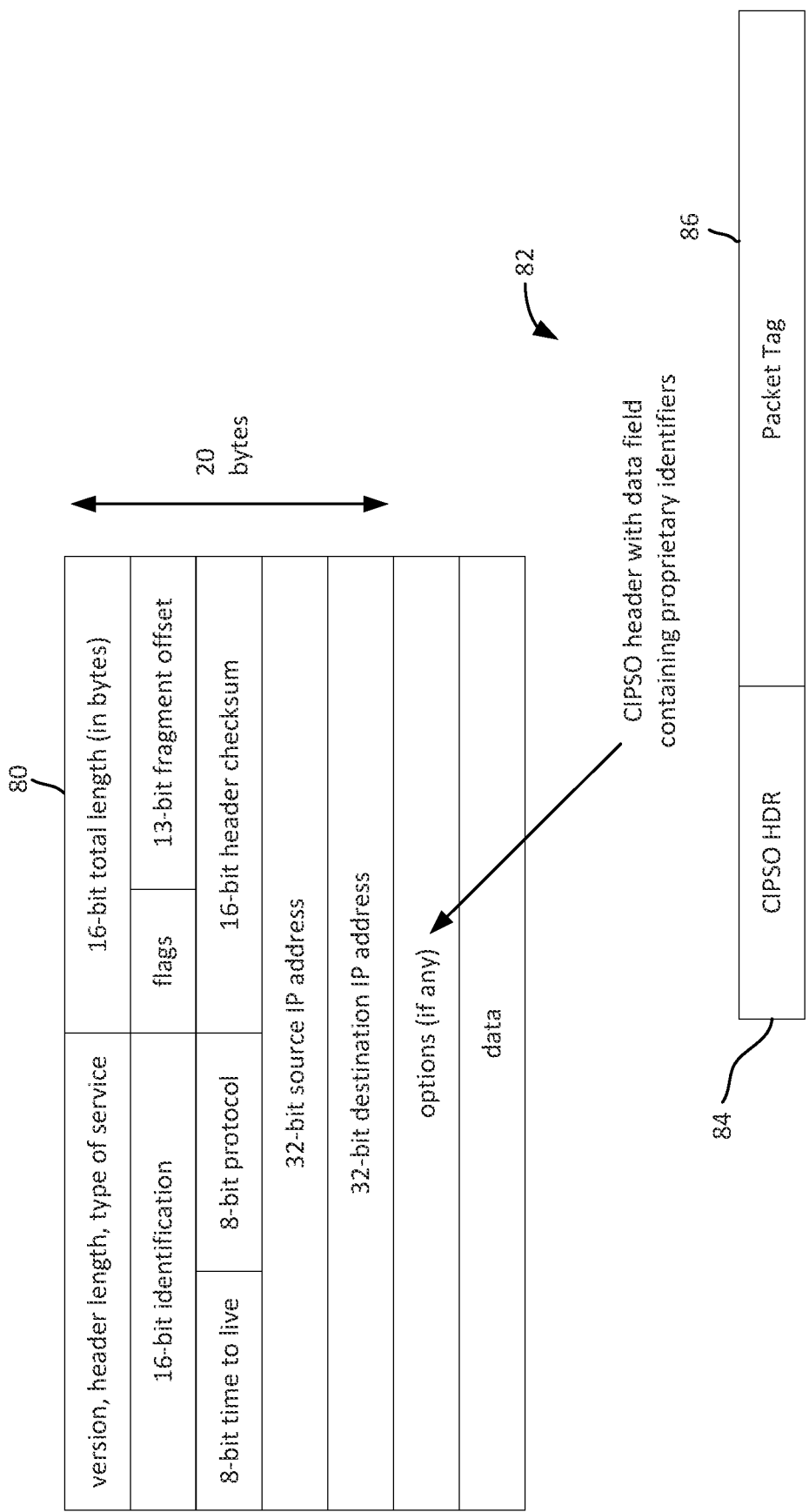
FIG. 4 is a data model diagram that shows an example of a packet tag being inserted in a minute protocol version 4 packet in accordance with some embodiments.

In computing environments like that of FIG. 1, some embodiments provide multi-factor authentication of internal network communications (e.g., at layers below the application layer, such as at the transport or network layer). Further, some embodiments provide universal host identification. Some embodiments achieve one or both of these results by implementing a packet injected identifier. This identifier, in some embodiments, is unique for each host and may be transmitted in the IP header, e.g., within the OPTIONS field, as shown in FIG. 4. Placing this information in the IP header is expected to allow for more uniformity in the protocol instead of implementing unique tags for UDP, TCP, and ICMP (though embodiments are also consistent with monitoring and injection of identifiers in headers of these protocols as well). Also, in the case of IPSEC or potentially other encryption schemes, the underlying headers may be obscured and/or immutable. By only modifying the IP header, embodiments are expected to allow for a more consistent packet structure and data offset, for reading and writing of the tag data (though again, other aspects of network traffic may be modified in some embodiments). This, in turn, is expected to allow embodiments to passively identify hosts on the network and rapidly correlate the sender and if the traffic is legitimate or not as such in the case of spoofing or man in the middle attacks. Depending on the needs of the network, the ID can be static, dynamic, encoded, or encrypted. (See IPv4 Packet Tag diagram).

In some embodiments, a unique identifier may be injected into each packet transmitted from the host. In some cases, the identifier is an identifier of the host and distinguishes the host from other hosts (e.g., endpoints on a network, such as computing devices having respective addresses on the network). In some cases, the unique identifier is injected in the network stack of an operating system, outside of userland portions of the OS. In some cases, the identifier is injected after handoff of network traffic from an application to a network socket. In some cases, the identifier is injected before packets are placed in buffers in system member, e.g., before firmware of a network interface retrieves the packets (e.g., via direct memory access) to a first-in-first-out buffer of the network interface. Or in some cases, firmware of the network interface may be configured to insert the identifiers, e.g., upon loading to the FIFO or upon reading from the FIFO. In some cases, encryption may be certificate based, e.g., based on a certificate issued by a certificate authority to an entity operating the security event processing system. In some cases, the secret identifiers may be associated with hosts in the security event processing system, but the secret identifiers may be concealed in network traffic and to receiving computing devices by encryption.

In various embodiments, identifier can be encrypted, encoded, static or dynamic. In some embodiments the identifiers are a digital signature (e.g., of the packet, or of a secret identifier of the host (e.g., one that is concealed from a party viewing network traffic). In some cases, a secret identifier of each host may be encrypted with a public key of the security event processing system. Thus, some embodiments may implement asymmetric public key encryption to encrypt the unique identifiers (which in some cases is independent of any encryption applied to payloads of packets). In some cases, encryption may be certificate based, e.g., based on a certificate issued by a certificate authority to an entity operating the security event processing system. In some cases, the secret identifiers may be associated with hosts in the security event processing system, but the secret identifiers may be concealed in network traffic and to receiving computing devices by encryption.

In some cases, the unique identifiers allow for other hosts to quickly identify true-source-sender of packet data. For instance, upon receiving a packet, some embodiments may parse a header to retrieve the identifier. Some embodiments may send the encrypted identifier to the security event processing system 14, which may decrypt the identifier and determine it is authentic (e.g., determine that it matches a secret identifier of a known host), and send a response indicating that the packet is safe to advance through a network stack. In some cases, a receiving device may initiate this process periodically, upon a new session, or for a certain percentage of packets from a give host.

Thus, some embodiments provide for multi-factor authentication and source host validation not natively provided in the IP framework.

In some embodiments, the packet tag (e.g., the unique identifier) can be applied in software at the OS network stack or in a firmware/hardware solution built into a machine's NIC. The packet tag can also be read either by a machine with an agent installed (e.g., in a driver), or a networking device able to parse the IP header and read the packet tag.

Figure 5:
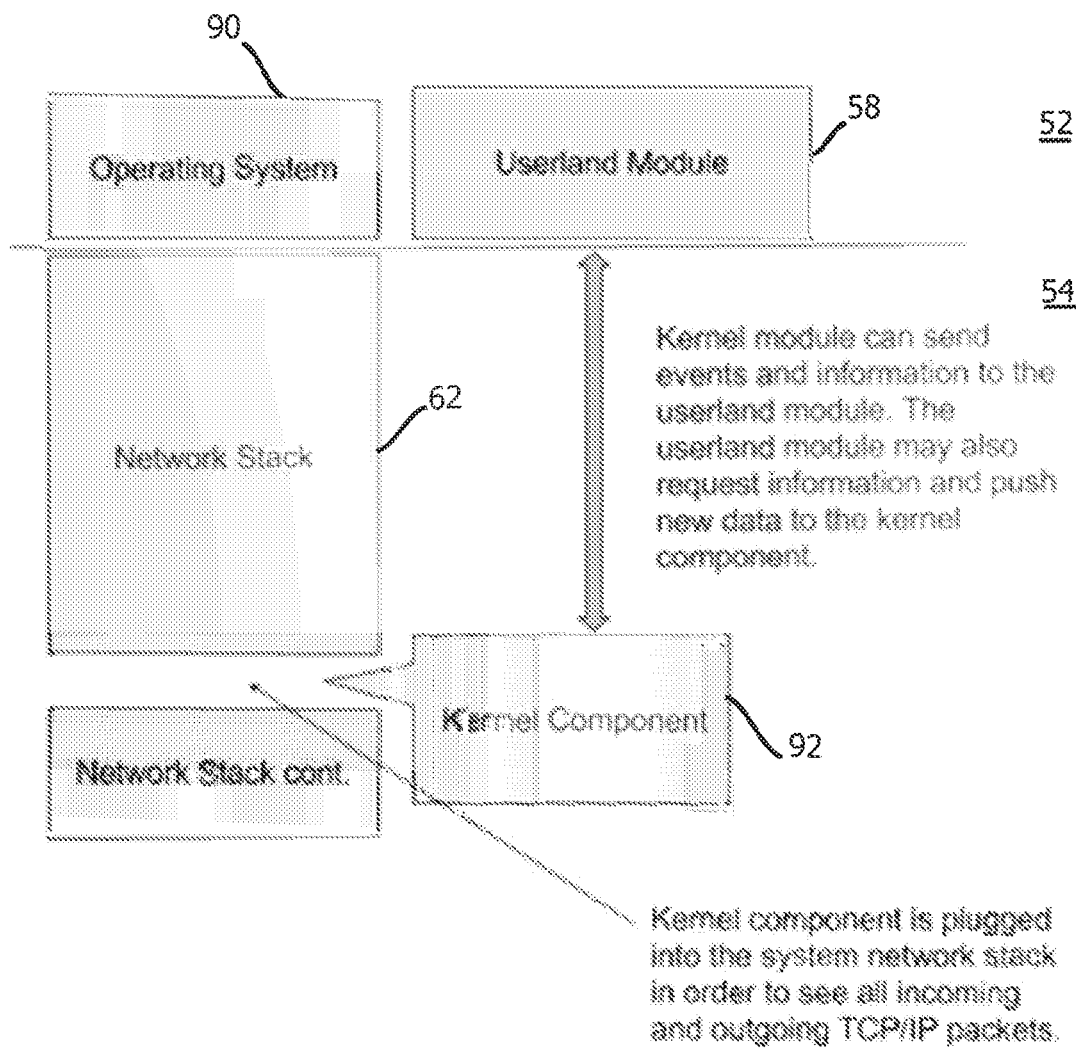
FIG. 5 is a logical architecture diagram that shows an example of how some embodiments may interact with a network stack within a computing device in accordance with some embodiments.

Some embodiments include a software mechanism in the form of a kernel driver that provides visibility into the raw communications path of the host. This provides some embodiments the ability to manipulate the packets, collect verbose data from the network communication, and a mechanism to correlate the application and the generated network communications observed, as shown in FIGS. 2, 3, and 5.

Figure 2:
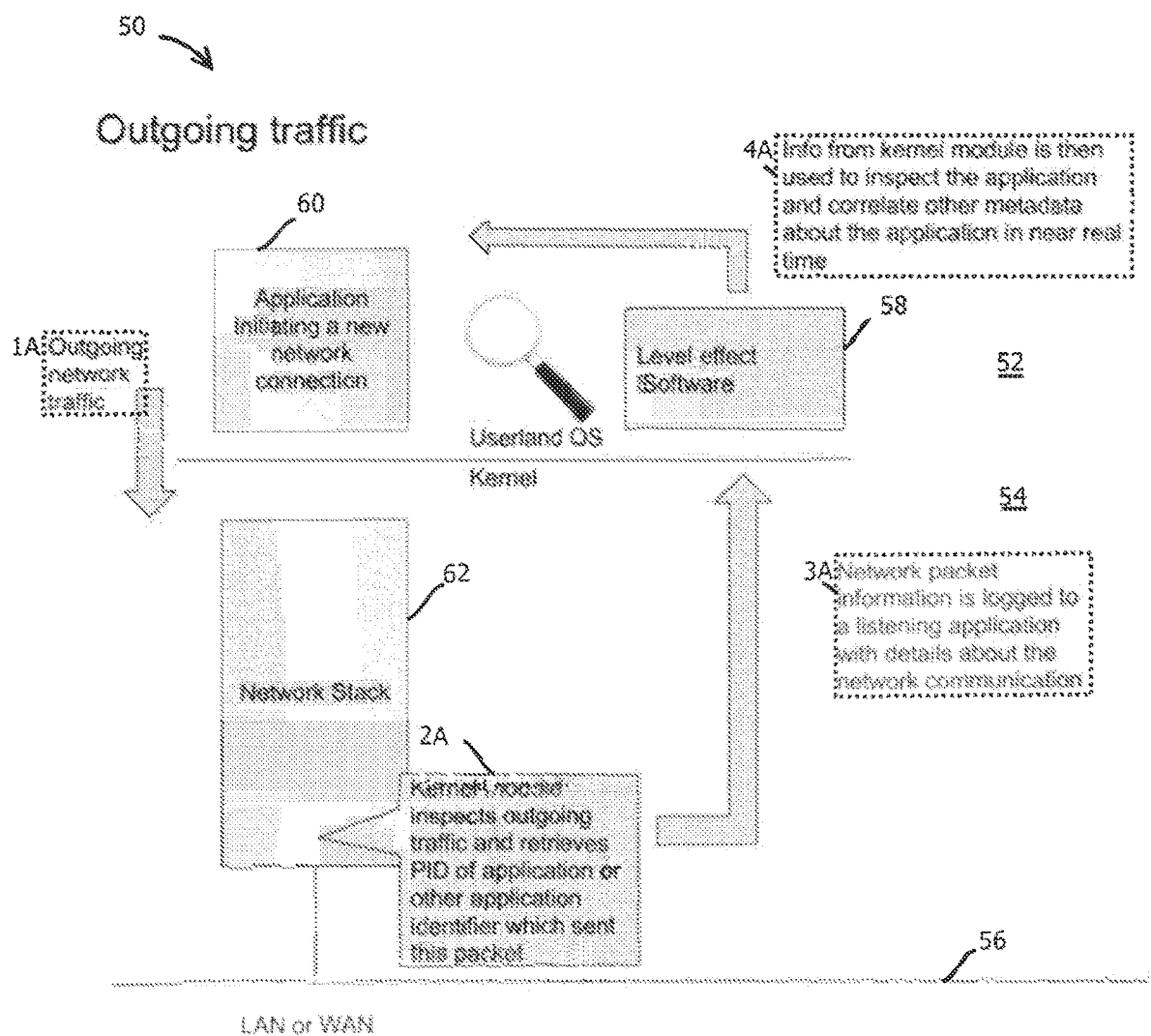
FIG. 2 is a mixed flow chart and logical architecture block diagram that shows an example of analysis of outgoing traffic within a given computing device in accordance with some embodiments.
Figure 3:
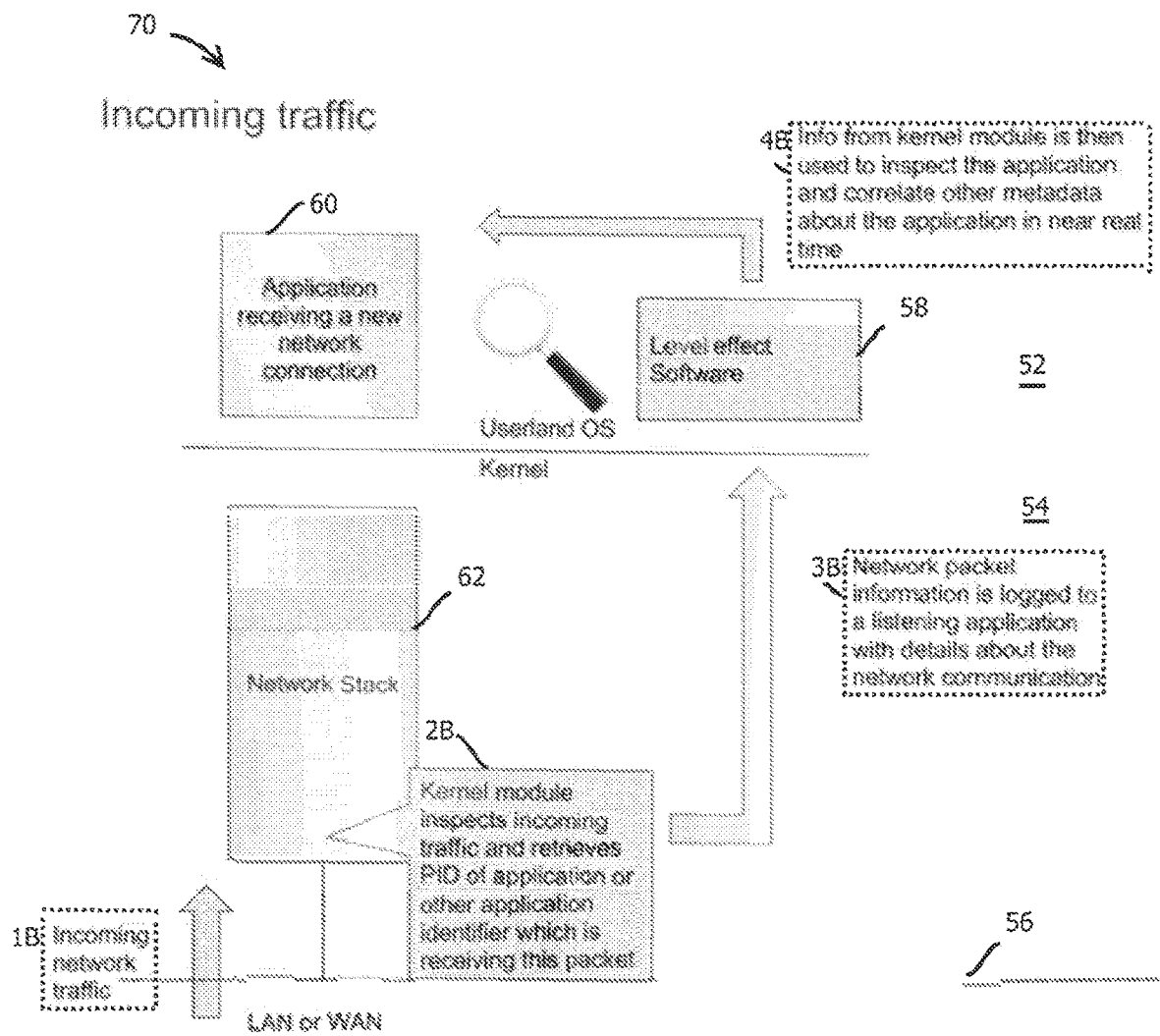
FIG. 3 is a mixed flow chart and logical architecture block diagram that shows an example of analysis of incoming network traffic in accordance with some embodiments.

FIG. 2 is a hybrid flowchart and architecture block diagram depicting processing of outgoing network traffic within one of the above-described computing devices. In some embodiments, the computing device 50 may include an application 60 that initiates a new connection, for instance by opening or accessing a network socket of the computing device 50. As illustrated, the operating system may enforce different levels of privilege in userland 52 and kernel space 54. The illustrated application 60 may generate outgoing network traffic, as indicated by operation 1A This outgoing network traffic may be processed by a network stack 62 of the computing device 50. In some embodiments, the network stack 62 may segment application-layer communications into quantized units of application-layer data, package those quantize units into transport-layer network packets, and then package those transport-layer network packets into network-layer network packets that are provided to a network interface for transmission on a physical media 56.

During this process, a kernel driver like that described below with reference to figure and elsewhere herein may inspect the outgoing traffic and associate packets with identifiers of applications sending that network traffic, as indicated by operation 2A. In some embodiments, the kernel driver may apply kernel-filter criteria indicative of which network traffic is to be deemed potentially malicious. In some embodiments, the filter criteria may include a white list or blacklist of Internet Protocol addresses, ports, protocols, or the like designating these attributes (or combinations thereof) as indicative of malicious acts or not indicative of malicious acts. In some embodiments, the filter criteria may include patterns, such as regular expressions, applied to metadata of packets or payloads of packets indicative of malicious acts or non-malicious usage. In some embodiments, the filter criteria may include models trained on historical network traffic and configured to output an indication of whether new network traffic is anomalous relative to historical usage patterns. In some cases, inputs to the model may include a time of day of transmission, sender or receiver network address report, protocol, terms appearing within payloads, rates of transmission or reception, or rates of transmission or reception of packets having various attributes like those described. In some cases, anomalies may be detected by training a hidden Markov model or recurrent neural network on historical network traffic, for example, on collections of sessions, and some embodiments may assign probabilities to various attributes of subsequently received network packets given a sequence of previously received (e.g., received by the driver and either being sent or received by the computing device). Upon receiving a network packet having less than a threshold probability, that network packet may be deemed anomalous and potentially indicative of an attack. In other examples, anomalies may be detected by training a clustering model on historical network traffic, for instance a density-based clustering algorithm, like DB-SCAN, CLARANS, or OPTICS. Some embodiments may represent attributes of historical network traffic as scalars in a packet or session vector, and some embodiments may determine clusters of those vectors from historical network traffic. Upon receiving later packets, some embodiments may determine whether the later received packet (or session) is an outlier relative to these previously determined clusters by representing the newly received packet (or session) as a vector and determining whether the vector is part of one of the previously determine clusters (e.g., is within a convex hull or has less than at threshold distance in vector space to a member thereof).

In some embodiments, the resulting network packet information may be logged to a listening application (e.g., an intrusion-detection agent) with details about the communication, as indicated by operation 3A. Those details may include metadata of the packet, such as header information at various layers, the identifier of the application, identifiers of one or more filter criteria applied by the kernel driver indicating which criteria were satisfied or not satisfied, a timestamp of the network packet, and the like. In some embodiments, this log information may be processed by an agent 58, which in some cases may associate the logged information with additional forensic data gathered from user land application program interfaces of the operating system, like those described elsewhere herein. In some embodiments, the agent 58 may apply various criteria to determine whether the resulting aggregate information indicates a potential attack is occurring, and in some cases report this information into the cloud for further processing and aggregation and correlation across different computing devices, for instance by the security event processing system 14. In some embodiments, these various components may modify one another's rules responsive to results of analyses.

In some embodiments, the intrusion detection agent may associate with the reports of network packets (which may include reports of sessions containing such packets) additional forensic information about the corresponding application to which or from which the network packets are sent or received. In some cases, this may include accessing via application program interfaces of the operating system exposed to userspace applications various attributes of the identified application associated with the reports of network packets. Examples include memory utilization, access to various files, changes to various files, changes to registry settings, CPU utilization, rates of reading or writing to storage, crash reports, system events, and the like.

In some embodiments, this forensic information may be associated with the report of the network packet from the driver, and some embodiments may compare the resulting data set to various threat-classification criteria indicative of which reports of network packets identify potential attacks. The threat-classification criteria may take various forms, including specified rules in a policy, patterns indicative of known types of attacks that are hand coded or adjusted with machine learning techniques, and trained models by which anomalous behavior may be detected. In some embodiments, techniques like those described above may be applied by the agent to the larger suite of data available upon marrying the forensic information with the network packet reports. In some embodiments, upon criteria being satisfied (e.g. a binary result of true or false, depending upon semantic value, or upon a threshold being exceeded or not being exceeded, depending upon sign of scores, some embodiments may determine that a network packet (e.g., a session including a network packet, or an individual packet) should be deemed malicious. Responsive to detecting a pattern, the agent may instruct the driver to take remedial actions like those described elsewhere herein, adjust criteria, or gather and report back more information. In some embodiments, upon network traffic being deemed malicious, or upon generating metrics indicative of aggregate properties of malicious and non-malicious network traffic, results may be reported to the security event processing system 14, for example, via a local area network and the Internet.

In some embodiments, the security event processing system may be on premises or off premises, for example, in a remote data center, and may be a distributed application that aggregates intrusion detection reports from a plurality of computing devices on one or more subnets. In some embodiments, the security event processing system 14 is configured to detect patterns across a plurality of computing devices reports within a given network, within a given tenant's data, or cross data from multiple tenants. Pattern detection may take various forms, examples including detecting anomalous network-wide patterns, for example rates of network traffic satisfying various criteria that are more than a threshold number of standard deviations from a mean rate, detecting a change in graph attributes of pairwise communication graphs, like a change in between this centrality of a communication graphs of network endpoints of greater than a threshold amount, detecting changes in a measure of central tendency (such as mean, median, or mode) of various forensic attributes associated with network traffic reported by agents across the network, and the like. Responsive to detecting a pattern, the security event processing system may instruct agents to take remedial actions like those described elsewhere herein, adjust criteria, or gather and report back more information.

FIG. 3 is a hybrid flowchart and architecture block diagram depicting outgoing network traffic of a computing device 70, which may be the same as the computing device 50 in some cases. Operations like those described above may be applied to the outgoing network traffic. In some embodiments, an application receiving a new network connection or traffic in existing network connection may receive that data via the network stack 62 of the computing device 70. In some embodiments, incoming network traffic may be received from a physical media 56, as indicated by operation IB. In some embodiments, the incoming network traffic may be processed by the network stack 62, which in some cases may reverse the operations described above and route the assembled information to the appropriate application 60, some in some cases subject to intervention and processing by a kernel driver like that described elsewhere herein. In some embodiments, the kernel driver may inspect incoming traffic and associate the incoming traffic with an identifier of the application to which the network traffic is addressed, as indicated by operation 2B. In some embodiments, this information may be logged to a listening application, as indicated by operation 3B, such as the agent 58. In some embodiments, information from the kernel driver may then be combined with forensic data and applied to various criteria to determine whether a potential attack is occurring, as indicated by operation 4B.

FIG. 4 shows an example of a network-layer network packet 80, such as an Internet protocol packet having a network tag 82 injected. In this example, the network tag 82 may include a header and 84 and a packet tag 86, which in some cases may be inserted in an optional field of an Internet protocol packet 80.

FIG. 5 shows an example of a kernel driver 92 interfacing with the network stack 62 of an operating system 90. As mentioned, the kernel driver may send events and information to a userland module 58, such as the above-described intrusion-detection agent executing in user space.

The deployed kernel driver on the end-host is expected to provide access, visibility, and mutability of network communications. In many cases, if the driver were not located in the OS kernel, the software would not have the required privileges to modify the packets and would only be able to read them. (Though other embodiments may implement this technique with firmware, e.g., executing on the NIC.) This also is expected to allow for functionality such as terminating an established connection or preventing one from occurring. All of which are generally not possible at the non-kernel layers of the OS. The term "kernel driver" is used herein to refer to code that is afforded the privileges associated with a driver operating in kernel space, and the term is not limited to a single process and is not limited to code that serves as the primary interface between the OS and a peripheral, which is not to suggest that any other description herein is limiting.

Generally, modem operating systems maintain a layer of abstraction between the address space of the physical memory of the computing (e.g., random access memory) and the address space presented to applications executing on the computing device. Virtual memory techniques map process-specific memory address spaces to physical memory and thereby prevent one process from reading or writing to physical memory allocated to another process. Similar techniques isolate privileged OS processes, like the kernel, from userspace (also called userland) applications, the latter being the types of applications one typically installs within the operating system and accesses, such as productivity suite applications, games, web browsers, and the like. In some embodiments, the OS shields userspace applications from memory management tasks, like explicitly managing how memory is paged, managing process context switching, and interfacing with interrupts, interrupt request levels, and accessing hardware registers. Kernel drivers, in contrast, often undertake these tasks and are afforded a more privileged view of the operation of the OS.

In some embodiments, kernel (and thus the kernel driver) visibility provides 'ground truth' of application Process Identifier (PID) to provide correlation of network events to the associated application's PID in the event that malicious software is misinforming higher layer APIs in the operating system. By placing the driver as low as possible in the kernel stack, embodiments circumvent theses APIs and gather more accurate information via the driver than is available directly to userspace applications. In some cases, a PID of a process (e.g., and related data) that subscribes to a socket to which a packet is addressed or from which a packet is sent may be associated with a unique identifier of a packet and reported to the security event processing system 14 (or otherwise used to analyze and enrich network communications to detect attacks).

In some embodiments, this implementation could be moved into a firmware driver for a NIC and provide a similar mechanism as the software only version and allow for the same reading and modifying of network packets in and out of the system The correlation of data, in some embodiments, is performed when the source or destination application of the packet on the machine is determined. Once the application which initiated or is receiving the packet is ascertained, further information about that application can be collected to verify the connection to make an educated decision on whether or not this communication is or is not malicious (or ascribe some probabilistic score), as shown in the network tipping mechanism diagrams of FIGS. 2 and 3. In some cases, the analysis may be made partially or entirely locally (at a host) or at the security event processing system 14, which may send instructions back to a driver to block further network traffic (e.g., from or to a particular host or application PID) upon detecting an attack.

In some embodiments, the kernel driver has access to all layers of the network stack from within the kernel. In some cases, it only modifies packets at the IP layer however, as expressed above, due to the fact that that is generally the last layer before the Ethernet header is applied (and, thus, contains a relatively full set of data describing context of the payload, like source and sender IP address, source and sender port, packet sequence identifiers, session identifiers, and protocol identifiers) and the last layer that can be modified with a packet tag. Inspection of network packets however, can happen at any layer affording a view of any viable information to determine which application is sending or receiving said packet. The driver may be located above the hardware layer so that technologies like virtual network switching and receive side scaling can perform their operations prior to the network packet being made available to the kernel driver, allowing for visibility of the majority of network traffic in and out of the host computer, in some embodiments.

In some embodiments, the kernel driver interfaces with an emulated networking stack of a virtual machine and a different kernel driver interfaces with a networking stack of a host machine on which one or more instances of the virtual machine execute. In some cases, the kernel driver obtains partially or fully formed network communications, e.g., a packet that will be, or was, encapsulated in a lower-level protocol, like in the payload of an Ethernet frame, and operates upon the obtained network communication, e.g., parsing headers information, decapsulating payloads, and repeating for higher-levels of encapsulation. In some cases, the resulting record is associated with a process identifier, filtered, and if it passes the filter, is reported to the agent executing in userspace by the kernel driver.

Reporting may take various forms, including accessing, with the kernel driver, memory addresses allocated to the userspace agent, and writing reported values to those addresses, e.g., in a ring buffer having a read pointer and a write pointer, and some embodiments may update the write pointer to a next open address after writing. Or reporting may be implemented via a system call or via the networking stack, for instance, by sending an API call to the agent via a port assigned to the agent and a loopback IP address of the host machine. Reports may be in the form of a pointer or a copy of data. The report may be of an entire packet, metadata of a packet (e.g., any data of the packet other than the payload), a classification of the packet, or a statistic or analysis based on the packet (e.g., a classification of a set of packets, like in a TCP session).

Applicants are said to have "sent" network packets upon that application handing off data that populates a payload of that packet (or a payload of another packet encapsulated by that network packet) upon the application handing off the data to the networking stack. Thus, a packet need not have left the NIC for it to be said to have been "sent" by the application.

In some embodiments, the security event processing system 14 may aggregate events (e.g., reports indicating a unique identifier of a received packet or a sent packet and a sender or receiver identifier, in some cases along with PID information) from each of the computing devices, e.g., across a subnet 12 and in some cases, across multiple subnets 12. Some embodiments may detect anomalous patterns in these records and instruct drivers on computing devices via the networks to block certain traffic deemed higher risk.

In some embodiments, the operating systems described above also run a userland module (e.g., an agent) that receives the packet-related reports noted above and enriches them with PID-related information of a PID registered in the OS with a sending or receiving network socket of the packet. Examples include enriching with identifying parent or child services and other related Pills, identifying ranges of memory in which the code of the process is executing, retrieving portions of that code or applying various queries (e.g., regular expressions) against that code to detect known threats, etc.

Thus, some embodiments may provide enhanced security without requiring highly-trained security staff to properly configure a network intrusion detection appliance on each subnet. Further, because the detection techniques are endpoint based, the processing power and analysis is distributed in some embodiments, allowing the system to scale with the size of the network.

Figure 6:
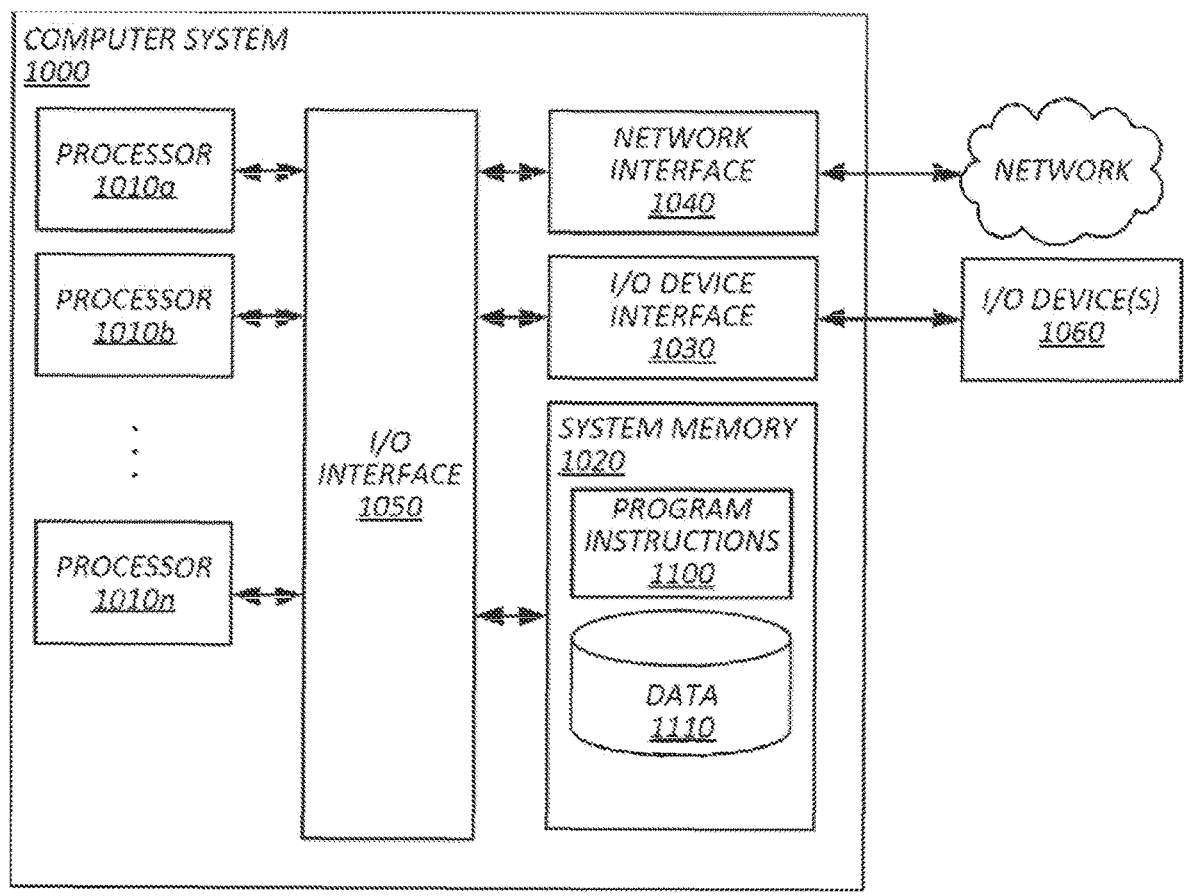
FIG. 6 shows an example of a computing device by which the present techniques may be implemented.

FIG. 6 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program earner having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system I 000 may be transmitted to computer system I 000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor I performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Yon the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing instructions that when executed by one or more processors effectuate operations comprising: instantiating, with one or more processors, a networking-stack, intrusion-detection kernel driver in kernel space of an operating system of a host computing device connected to a network, where the kernel driver is configured to: obtain kernel-filter criteria indicative of which network traffic is to be deemed potentially malicious, determine that a network packet is resident in a networking stack of the operating system of the host computing device, access at least part of the network packet, apply the kernel-filter criteria to the at least part of the network packet and, based on applying the kernel-filter criteria, determining that the network packet is potentially malicious, associate the network packet with an identifier of an application executing in userspace of the operating system and to which or from which the network packet is sent, and report the network packet in association with the identifier of the application to an intrusion-detection agent executing in userspace of the operating system of the host computing device, the intrusion-detection agent being different from the application to which or from which the network packet is sent; and instantiating, with one or more processors, the intrusion-detection agent in userspace of the operating system of the host computing device, wherein the intrusion-detection agent is configured to: obtain threat-classification criteria indicative of which reports of network packets identify potential attacks; access the report of the network packet from the networking-stack, intrusion-detection kernel driver; identify the application from the report of the network packet; access a forensic record associated with the application in memory by the operating system; apply the threat-classification criteria to the report of the network packet and the forensic record and, based on applying the threat-classification criteria, classify the network packet as malicious; and in response to classifying the network packet as malicious, recording an indication of the classification in memory.

2. The medium of embodiment 1, wherein: the intrusion-detection agent is configured to report the classification to a security event processing system via a network; and the operations comprise instantiating the security event processing system on one or more computing devices other than the host computing device, wherein the security event processing system is configured to: receive the report of the classification and reports of a plurality of other classifications from other instances of the intrusion-detection agent executing on other computing devices, and determine that an attack is occurring or is potentially occurring based on the report of the classification and reports of a plurality of other classifications from other instances of the intrusion-detection agent executing on other computing devices.

3. The medium of embodiment 2, wherein: the security event processing system is configured to: determine an adjustment to the threat-classification criteria in response to the determination that an attack is occurring or is potentially occurring, and instruct the intrusion detection agent to adjust the threat-classification criteria to apply criteria that have a larger computational load than criteria applied before the adjustment; and the intrusion-detection agent is configured to adjust the threat-classification criteria and apply the adjusted thread-classification criteria in response to the instruction.

4. The medium of embodiment 3, wherein: the intrusion-detection agent is configured to: determine to adjust the kernel-filter criteria in response to instruction from the security event processing system.

5. The medium of any one of embodiments 1-4, wherein: the intrusion-detection agent is configured to: determine to adjust the kernel-filter criteria in response to classifying the network packet as malicious, and instruct the networking-stack, intrusion-detection kernel driver to apply adjusted kernel-filter criteria, wherein the adjusted kernel-filter criteria filter out less information reported to the intrusion-detection agent after the adjustment than before the adjustment.

6. The medium of any one of embodiments 1-5, wherein: the kernel-filter criteria comprise rules white listing or black listing network addresses or ports.

7. The medium of any one of embodiments 1-6, wherein: the kernel-filter criteria comprise a rule specifying a maximum amount or rate of communication to, from, or through a network host or set of network hosts.

8. The medium of any one of embodiments 1-7, wherein: the kernel-filter criteria comprise a rule specifying a transport-layer protocol, a port, and a set of network addresses for which packets are to be deemed malicious or non-malicious.

9. The medium of any one of embodiments 1-8, wherein: the kernel-filter criteria comprise: a model configured to output a score indicative of whether a packet is anomalous, the model being trained on historical network communication of the computing device or other computing devices, and a rule specifying a threshold score that when satisfied indicates the network packet is malicious.

10. The medium of embodiment 9. wherein: output of the model is based on the following inputs to the model: a time of day of the packet; past packets in a session including the packet; a port number from which the packet is sent; a port number to which the packet is sent; a transport layer protocol of the packet or encapsulated payload of the packet; and an application name associated with the application identifier.

11. The medium of any one of embodiments 1-10, wherein: determining that a network packet is resident in a networking stack of the operating system of the host computing device comprises receiving an interrupt indicating that an Internet Protocol packet is ready to be written to a buffer of a network interface.

12. The medium of any one of embodiments 1-11, wherein accessing at least part of the network packet comprises: parsing a first header from the network packet; parsing sender network address from the first header of the network packet; parsing a receiving network address from the first header of the network packet; decapsulating an encapsulated packet from a payload of the network packet; parsing a second header from the encapsulated packet; parsing a sender port from the second header; parsing a receiver port from the second header; and determining a transport layer protocol of the encapsulated packet.

13. The medium of any one of embodiments 1-12, wherein: associating the network packet with the identifier of the application executing in userspace of the operating system and to which or from which the network packet is sent comprises associating the network packet with a process identifier assigned to the application by the operating system, the application being one of a plurality of applications executing in the operating system, each respective application being assigned a different process identifier by the operating system.

14. The medium of any one of embodiments 1-13, wherein: the threat-classification criteria comprise: an anomaly detection model; a pattern that specifies both features of the report of the network packet and features of the forensic record; and a policy specifying permitted or prohibited behavior by network traffic and permitted or prohibited forensic state of an application executing on the operating system.

15. The medium of any one of embodiments 1-14, wherein:
the forensic record associated with the application in memory of the operating system includes at least three of the following: memory usage of the application, file state of files read or written by the application, registry state of or accessed by the application, configuration state of the application, process state of the application, user accounts interfacing with the application, network usage by the application, or system events caused by the application.

16. The medium of any one of embodiments 1-15, wherein: the network packet is being sent by the application; and determining that the network packet is potentially malicious is executed before a network interface of the computing device transmits the network packet.

17. The medium of any one of embodiments 1-16, wherein: the network packet is to be received by the application; and determining that the network packet is potentially malicious is executed before application-layer content of the network packet is provided to the application.

18. The medium of any one of embodiments 1-17, wherein: classifying the network packet as malicious is executed in real time.

19. The medium of any one of embodiments 1-18, wherein: the intrusion-detection agent is configured to cause the network packet or subsequent network packets to be blocked before fully traversing the networking stack.

20. The medium of any one of embodiments 1-19, wherein: the intrusion-detection agent is configured to cause the network packet or subsequent network packets to be delayed for a configurable amount of time in response to classifying the network packet as malicious.

21. The medium of any one of embodiments 1-20, wherein: the intrusion-detection agent is configured to cause the network packet or subsequent network packets to be sent to a different network address from that specified by a recipient header of the network packet in response to classifying the network packet as malicious.

22. The medium of any one of embodiments 1-21, wherein: the intrusion-detection agent is configured to rate limit transmission or reception of subsequent network packets in response to classifying the network packet as malicious.

23. The medium of any one of embodiments 1-22, wherein: the intrusion-detection agent is configured to cause payloads of the network packet or subsequent network packets to be modified in response to classifying the network packet as malicious.

24. A method, comprising: the operations of any one of embodiments 1-23.

25. A system, comprising: a plurality of processors; and memory storing instructions that when executed by the processors cause the processors to effectuate operations comprising: the operations of any one of embodiments 1-23.

What is claimed is:
1. A method, comprising:
determining, by a driver instantiated in kernel space of an operating system of a computing device and based on a trained model, that a network packet is potentially malicious;
associating, by the driver, the network packet with an application executing in userspace of the operating system, the network packet being sent from or to the application; and
blocking or preventing a malicious attack to the computing device based on a malicious classification of the network packet in response to the determining that the network packet is potentially malicious and associated with the application;
wherein the determining that the network packet is potentially malicious includes:
parsing a sender network address from a first header, the first header being from the network packet;
parsing a receiving network address from the first header, decapsulating an encapsulated packet from a payload of the network packet,
parsing a sender port from a second header, the second header being from the encapsulated packet,
parsing a receiver port from the second header; and
determining a transport layer protocol of the encapsulated packet.

2. The method of claim 1, wherein the determining that the network packet is potentially malicious further includes:
inputting at least one of a time associated with the network packet, a sender network address report associated with the network packet, a receiver network address report associated with the network packet, a protocol associated with the network packet, a term appearing in the payload associated with the network packet, a rate of transmission associated with the network packet, or a rate of reception associated with the network packet to the trained model to generate an output indicating that the network packet is potentially malicious.

3. The method of claim 1, wherein the trained model was trained on historic network traffic of the computing device or other computing devices associated with the computing device and the network packet is potentially malicious relative to historical usage patterns.

4. The method of claim 1, wherein the network packet is processed by a network stack of the computing device.

5. The method of claim 1, wherein:
the blocking or preventing includes disconnecting an existing connection or a subsequent connection between the computing device and a network communicatively coupled with the computing device to block or prevent the malicious attack to the computing device.

6. The method of claim 1, further comprising:
receiving, at the driver, instructions from an agent executing in the userspace of the operating system and based on the malicious classification to block subsequent network traffic sent to the application or the computing device.

7. The method of claim 1, wherein:
the application is associated with an identifier that includes a process identifier assigned to the application by the operating system, the application being one of a plurality of applications executable in the operating system, each application from the plurality of applications being assigned a different process identifier by the operating system.

8. The method of claim 1, wherein:
the network packet is to be received by the application; and
the determining that the network packet is potentially malicious is executed before application-layer content of the network packet is provided to the application.

9. A processor-readable non-transitory medium storing code representing instructions to be executed by a processor, the code comprising code to cause the processor to:
receive, at an agent and from a driver, a report generated based on a trained model, the driver instantiated in kernel space of an operating system of a computing device, the agent executing in userspace of the operating system;
determine, based on the report, a network packet is potentially malicious; and
send, by the agent, in response to the determining the network packet as potentially malicious, and based on a malicious classification of the network packet, an instruction to disconnect an existing connection or a subsequent connection between the computing device and a network communicatively coupled with the computing device;
wherein the determining that the network packet is potentially malicious includes:
parsing a sender network address from a first header, the first header being from the network packet,
parsing a receiving network address from the first header,
decapsulating an encapsulated packet from a payload of the network packet,
parsing a sender port from a second header, the second header being from the encapsulated packet,
parsing a receiver port from the second header, and
determining a transport layer protocol of the encapsulated packet.

10. The processor-readable non-transitory medium of claim 9, wherein the trained model is at least one of a recurrent neural network, a hidden Markov model, or a clustering model, the trained model trained using historical network traffic data of the computing device or other computing devices associated with the computing device.

11. The processor-readable non-transitory medium of claim 9, wherein the code to cause the processor to send the instruction includes code to cause the processor to block the network packet or subsequent network packets before fully traversing a network stack of the computing device, the network packet processed by the network stack.

12. The processor-readable non-transitory medium of claim 9, wherein the network packet is associated with an identifier of an application (1) executing in the userspace and (2) receiving or sending the network packet, the code further including code to cause the processor to:
access, by the agent and based on the identifier of the application, a forensic record associated with the application; and
determine, by the agent, the malicious classification of the network packet by applying a threat-classification criteria to the report and the forensic record.

13. The processor-readable non-transitory medium of claim 9, wherein:
the trained model is configured to output a score indicative of whether the network packet is malicious, the trained model being trained on historical network communication of the computing device or other computing devices associated with the computing device;
the determination that the network packet is potentially malicious is made by the driver based on a kernel-filter criteria; and
the kernel-filter criteria include a rule specifying a threshold score that when satisfied by the score indicates the network packet is potentially malicious.

14. A processor-readable non-transitory medium storing code representing instructions to be executed by a processor, the code comprising code to cause the processor to:
collect, by a driver instantiated in kernel space of an operating system of a computing device communicatively coupled with a network, network traffic data processed by a network stack of the computing device, the network traffic data including a network packet;
determine, by the driver and based on a trained model, that the network packet is potentially malicious; and
send, by an agent executing in userspace of the operating system and in response to the determining that the network packet is potentially malicious, an instruction to adjust an amount of network traffic data that the driver collects in a subsequent repeating process;
wherein the determining that the network packet is potentially malicious includes:
parsing a sender network address from a first header, the first header being from the network packet,
parsing a receiving network address from the first header,
decapsulating an encapsulated packet from a payload of the network packet,
parsing a sender port from a second header, the second header being from the encapsulated packet;
parsing a receiver port from the second header; and
determining a transport layer protocol of the encapsulated packet.

15. The processor-readable non-transitory medium of claim 14, wherein the trained model is a clustering model trained using historical network traffic data of the computing device or other computing devices associated with the computing device, the historical network traffic data is associated with a set of vectors, the determining that the network packet is potentially malicious further including:
determining a plurality of clusters based on the set of vectors;
generating a vector based on the network packet; and
determining that the vector is part of a cluster from the plurality of clusters.

16. The processor-readable non-transitory medium of claim 14, wherein the code further comprises code to cause the processor to:

associate, by the driver, the network packet with an identifier of an application executing in userspace of the operating system, the network packet sent from or to the application; and determine a maliciousness classification of the network packet based on the identifier.

17. The processor-readable non-transitory medium of claim 14, wherein the code further comprises code to cause the processor to:

send, by the driver, a report of the network packet in association with an identifier of an application executing in userspace of the operating system to an intrusion-detection agent executing in the userspace of the operating system.

18. The processor-readable non-transitory medium of claim 14, wherein the code further comprises code to cause the processor to:

access, by the agent and based on an identifier of an application executing in the userspace of the operating system, a forensic record associated with the application; and determine a maliciousness classification of the network packet based on the forensic record.

19. The processor-readable non-transitory medium of claim 14, wherein the code further comprises code to cause the processor to:

determine, by the agent, a malicious classification of the network packet by applying a threat-classification criteria to a report of the network packet associated with an identifier of an application executing in the userspace of the operating system and a forensic record associated with the application.

* * * * *